(No Model.)
O. B. PECK.
APPARATUS FOR SEPARATING MOLTEN MATERIALS OF DIFFERENT SPECIFIC GRAVITY.
No. 484,452. Patented Oct. 18, 1892.
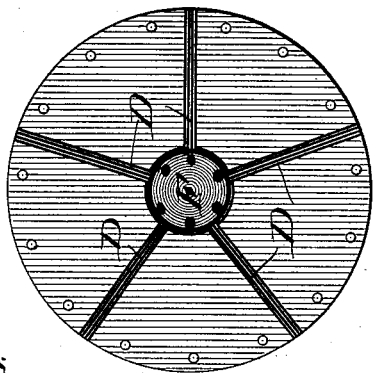
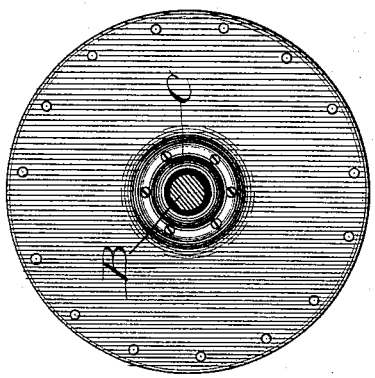
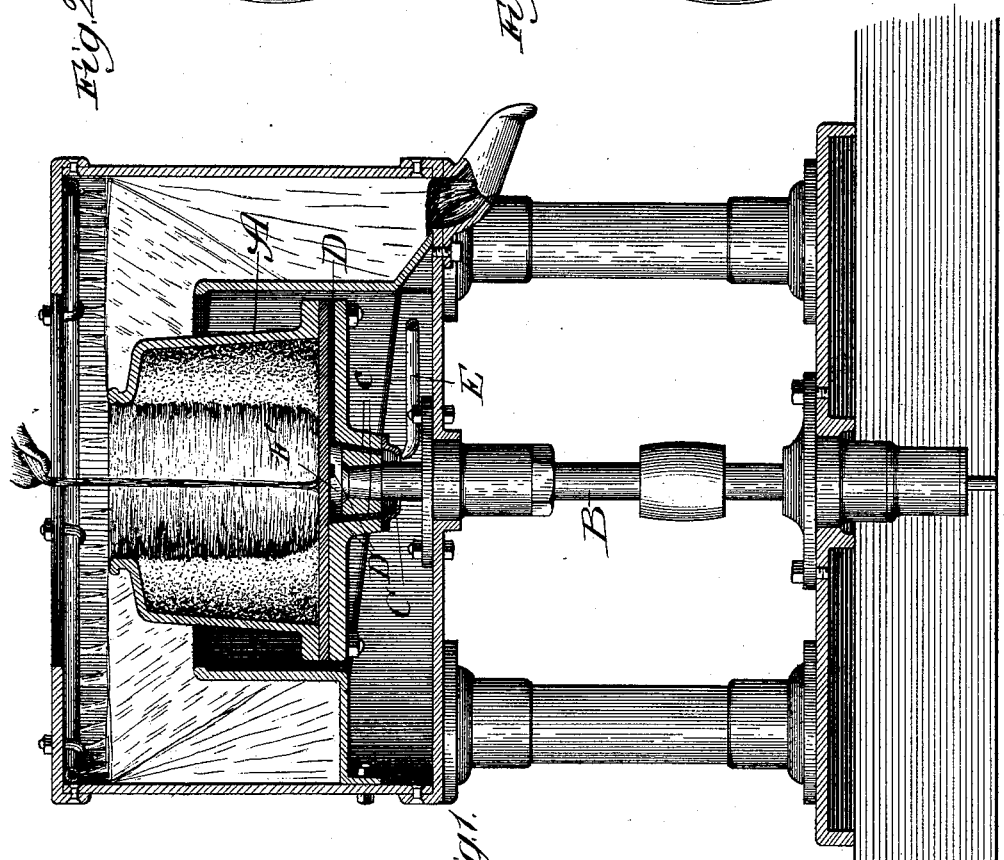
Witnesses:
Chas. E. Gaylord
Clifford W. White
Inventor:
Orrin B. Peck,
By Banning & Banning & Payson
Att'ys

UNITED STATES PATENT OFFICE.

ORRIN B. PECK, OF CHICAGO, ILLINOIS, ASSIGNOR TO MALINDA PECK, OF SAME PLACE.

APPARATUS FOR SEPARATING MOLTEN MATERIALS OF DIFFERENT SPECIFIC GRAVITY.

SPECIFICATION forming part of Letters Patent No. 484,452, dated October 18, 1892.

Application filed January 11, 1892. Serial No. 417,695. (No model.)

*To all whom it may concern:*

Be it known that I, ORRIN B. PECK, a citizen of the United States, residing at Chicago, Illinois, have invented certain new and useful Improvements in Apparatus for Separating Molten Materials of Different Specific Gravity, of which the following is a specification.

In the drawings, Figure 1 is a vertical section of my improved apparatus. Fig. 2 is a plan view of the bottom of such vessel viewed from above, and Fig. 3 is a plan view of the bottom of the apparatus viewed from below.

In making my improved apparatus for treating molten material containing particles of different degrees of specific gravity I make a rotatable vessel A, mounted upon and rotated by a shaft B, driven by any suitable motive power.

In order to keep the bottom of the treatment-vessel cool or from becoming overheated when in operation, I arrange on the bottom and surrounding the shaft a cup or bowl C, provided with a small annular opening around the shaft B. Leading up from such bowl or cup I arrange a number of grooves or channels c, with a number of channels or passages D, arranged in the bottom of the treatment-vessel and below the plate on which the material to be treated is received. I carry a pipe E, which introduces water into the bottom of the bowl C, where it is immediately carried by the action of centrifugal force to the outside of such bowl and up through the grooves or channels c and out through the channels or passages D, where it is permitted to escape. In this way I am able to maintain by the action of centrifugal force a constant flow of water through the bottom of the treatment-vessel, so that the same may be maintained at a sufficiently-low temperature. As the water is constantly flowing outward, so that I am unable to get this full cooling effect at the immediate center, I have arranged a depression F in the bottom of the treatment-chamber immediately above the top of the shaft B to prevent overheating at this point.

What I regard as new, and desire to secure by Letters Patent, is—

1. In an apparatus for treating molten material containing particles of different degrees of specific gravity, the combination of a rotatable treatment-vessel provided with a chamber or recess F in its bottom, passages or channels communicating with such chamber, and means for forcing water into such chamber and channels or passages, substantially as described.

2. In an apparatus for treating material containing particles of different degrees of specific gravity, the combination of a rotatable treatment-vessel provided with passages or channels through its bottom, open at their ends, a bowl or cup into which water may be introduced and forced through the passages or channels and away by the action of centrifugal force, means for supplying water to the bowl or cup, and means for rotating the vessel, substantially as described.

ORRIN B. PECK.

Witnesses:
THOMAS A. BANNING,
MARIE L. PRICE.